Sept. 7, 1965    R. E. RESH, JR    3,205,405
OVER-TEMPERATURE PROTECTION SYSTEM FOR A DYNAMOELECTRIC MACHINE
Filed Aug. 8, 1962    2 Sheets-Sheet 1

INVENTOR.
ROY E. RESH, JR.
BY Frank N. Decker Jr.
ATTORNEY.

Sept. 7, 1965 R. E. RESH, JR 3,205,405
OVER-TEMPERATURE PROTECTION SYSTEM FOR A DYNAMOELECTRIC MACHINE
Filed Aug. 8, 1962 2 Sheets-Sheet 2

INVENTOR.
ROY E. RESH, JR.
BY *Frank N. Decker Jr.*
ATTORNEY.

United States Patent Office 3,205,405
Patented Sept. 7, 1965

3,205,405
OVER-TEMPERATURE PROTECTION SYSTEM
FOR A DYNAMOELECTRIC MACHINE
Roy E. Resh, Jr., East Syracuse, N.Y., assignor to Carrier
Corporation, Syracuse, N.Y., a corporation of Delaware
Filed Aug. 8, 1962, Ser. No. 215,705
8 Claims. (Cl. 317—13)

This invention relates to dynamoelectric machinery, and, more particularly, to over-temperature protection arrangements for use with dynamoelectric machines, such as electric motors.

One of the limiting factors in the application and design of a dynamoelectric machine, such as an electric motor, is the maximum temperature which the insulated windings will be permitted or required to withstand. This factor in turn determines to a large extent the electrical rating of the machine, the frame size required for the machine, the amount of copper which must be used in the coil windings, the amount of machine cooling which must be provided, the type of insulation which must be used, and the life expectancy of the machine.

A motor coil winding, for example, normally becomes overheated either because of an overload imposed on the motor while it is running, or because the rotor member of the motor becomes locked on startup and is unable to rotate. If either of these two conditions is present, excessively high currents may be drawn by the motor armature winding, resulting in severe heating of the winding insulation. Eventually, the temperature may reach a point where the insulation is permanently charred or otherwise damaged and the motor then becomes inoperative and must be replaced.

In order to prevent damage to the motor winding insulation, it is customary to provide some type of temperature sensing means associated with the motor winding, and some type of over-temperature protection control circuit which disconnects the motor from the line current source thereby taking the motor off the line before the winding reaches a temperature at which serious damage is likely to be done to the insulation. It is frequent practice, therefore, to place a thermostatic switch or thermistor element on the motor casing, or to embed it in the coil winding in order to sense the over-temperature condition and to actuate the motor protection circuit.

However, these conventional motor protection systems normally exhibit a substantial time lag between the time the motor winding begins to heat excessively and the time at which the motor protection circuit takes the motor off the line. This time delay may be on the order of as much as ten to twenty seconds during which the motor winding temperature continues to rise and during which damage to the insulation may occur. The time lag is due to the fact that the temperature sensing element is spaced from the motor winding by the distance between the sensor and the winding; the heat which reaches the temperature sensor must pass through the motor winding insulation, the housing which surrounds the temperature sensor, and the space between the insulation and the housing if the sensor is not embedded directly in the winding. Consequently, the motor winding may reach a considerably higher temperature than the temperature sensor during the period before operation of the motor protection circuit. In order to avoid this temperature from rising to a point at which the insulation is seriously damaged, the temperature sensor is normally set to operate at some lower temperature which the insulation could safely withstand, but which is assumed to be indicative of a higher actual winding temperature due to the time lag in the response of the sensor.

In actual practice, prior art motor protection systems have been designed to provide over-temperature protection for running overload conditions, but because of their time lag, they have been unsatisfactory in protecting motors having high temperature rise rates during a locked rotor condition.

If the time lag between the rise in winding temperature and operation of the motor protection circuit could be made negligible, it is apparent that the customary overshoot in temperature of the motor winding could be virtually eliminated and satisfactory protection could be provided for both running overload and locked rotor conditions. At the same time, if the temperature overshoot is minimized, a given motor can be operated at heavier loads without danger to the insulation, and the life of the motor can be prolonged because motor insulation life is a function of time and temperature. Also, a less expensive class of insulation can be provided for a motor because the winding can be operated under normal conditions closer to the maximum permissible winding temperature due to the improved speed of response of the motor protection circuit. In many cases, the cost saving may be very substantial because of the permissible reduction in copper conductor required and because a motor which would otherwise require a larger frame size for its rated load capacity may be made with the next smaller frame size, due to improved over-temperature protection.

Accordingly, it is the principal object of this invention to provide an improved method and means of over-temperature protection in dynamoelectric machinery.

It is another object of this invention to provide an improved motor protection arrangement which is capable of protecting a dynamoelectric machine against both a running overload and a locked rotor condition.

In the illustrated preferred embodiments of this invention, these and other objects are achieved by directly securing a temperature responsive resistance element in physical contact with the metal conductor of the motor winding so that it is in intimate heat transfer relation with the metal conductor of the winding to form a static or solid state protection device. This intimate heat transfer relation permits the temperature sensing resistance element to respond immediately to a rise in winding temperature and reduces the time lag to a negligible extent, thereby providing greatly improved over-temperature protection. The temperature sensitive resistance element is connected to control a suitable motor protection circuit to provide a desired control function, such as taking the dynamoelectric machine off the line, actuating a warning system, or actuating suitable means for unloading or reducing the loading on the machine.

The temperature sensitive resistance element may be of the positive temperature coefficient type and is electrically connected to the motor winding in the preferred embodiments at a predetermined voltage point intermediate the ends of the winding. The motor protection circuit may include a relay in series with the resistance element so that the relay coil is energized by current taken from the motor winding. Upon a rise in temperature of the motor winding, the resistance of the resistance element rises therefore limiting the current through the relay coil to a point such that the relay becomes deenergized and controls the motor protection circuit, which, in the illustrated embodiments, include taking the motor off the line.

These and other objects of this invention will become readily apparent by reference to the following detailed description and drawings wherein.

Figure 1:
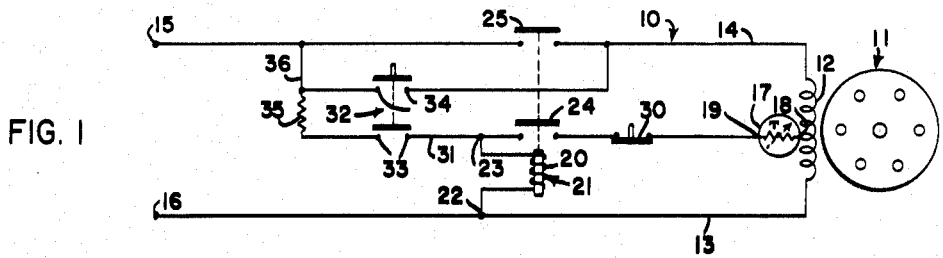
FIGURE 1 is a schematic diagram of a dynamoelectric machine embodying a motor protection system in accordance with this invention.

Referring particularly to FIGURE 1, there is schematically shown a motor protection system 10 for a dynamoelectric machine 11. Dynamoelectric machine 11, as shown in this figure, may be taken to be schematically illustrative of a single phase induction motor to which the following description will pertain. However, dynamoelectric machine 11 may alternatively comprise a single or multiple phase induction or synchronous motor or generator, a rotary condenser, or any type of A.-C. or D.-C. electrical equipment embodying a winding which it is desired to protect against the adverse effects of an overtemperature condition, such as an electromagnet.

Dynamoelectric machine 11, which will subsequently be referred to as a motor, is provided with a winding 12, which in this embodiment may be the stator winding. Winding 12 has suitable insulation thereon which is subject to damage or accelerated deterioration by the adverse effects of excessive temperature. Winding 12 is connected by conductor means 13 and 14 to a suitable source of current, such as power line terminals 15 and 16.

A temperature sensitive resistance element 17 is connected, as subsequently described in greater detail, in direct electrical and physical contact with motor winding 12 in order to afford an intimate heat transfer relationship between the resistance element and the electric conductor of the motor winding. Resistance element 17, in the illustrated embodiment, preferably has a positive temperature coefficient of resistivity, and is commonly referred to as a P.T.C. thermistor. Resistance element 17 may be made of any suitable materials to give the desired temperature resistance relationship. It has been found that a thermistor of about 1/16" x 1/16" x 1/4" in size comprising a semiconducting material of barium, strontium and titanium having a suitable doping agent provides a suitable and quickly responding positive temperature coefficient temperature sensitive element for the purposes of this invention. In practice, thermistors of a type suitable for use herein generally have a non-linear resistance slope with a relatively steep resistance-temperature slope over the operating range of temperatures selected for the operation of the motor control function described.

Resistance element 17 may be considered to have a terminal 18 which is directly connected to winding 12 and a terminal 19 which is connected in series with the contacts of a normally closed stop switch 30 and the actuating element of relay means 21, such as relay coil 20.

Relay means 21 is schematically illustrated in the drawing to comprise a conventional relay having a relay coil 20 with terminals 22 and 23, and two pairs of normally open switch contacts 24 and 25. As seen in the drawing, normally open contacts 24 are in series with terminal 23 of the relay coil and stop switch 30. The other pair of normally open contacts 25 are in series with conductor 14 between one terminal of winding 12 and line current terminal 15 in order to interrupt the supply of current to dynamoelectric machine 11. It will be understood that relay means 21 may actually comprise a thyratron or transistor switching circuit or any other suitable means for providing a desired switching or varying motor protection control function. It will also be understood that, while resistance element 17 is described as being preferably of the positive temperature coefficient type, by suitable circuit modification, resistance element 17 may be a negative temperature coefficient resistance element.

A conductor 31 connects the junction of terminal 23 and relay contacts 24 to one of a set of normally open contacts 33 on start switch 32. Start switch 32 may be of the momentary contact type having two sets of contacts 33 and 34, which are normally open, except when momentarily closed by pressure on the switch button. The other contact of switch contacts 33 is connected through a suitable current limiting resistor 35 to one of the set of start switch contacts 34 and by conductor 36 to line terminal 15. The other contact of start switch 34 is connected to conductor 14 on the side of start switch contacts 25 which is connected to winding 12 so that switch contacts 34 form a means for momentarily bypassing normally open relay contacts 25.

In operation, the components of motor protection circuit 10 are connected as shown in FIGURE 1 with motor 11. The operating button on start switch 32 is depressed momentarily closing switch contacts 33 and 34. Closing of switch contacts 34 bypasses normally open relay contacts 25 and supplies current for operation of motor 11, which starts running. At the same time momentary closing of switch contacts 33 passes current from line terminal 15 directly through current limiting resistor 35 to terminal 23, relay coil 20 and terminal 22, to line terminal 16, thereby energizing relay means 21.

Energization of relay means 21 by momentarily depressing start switch 32 closes contacts 24 and 25. Closing of relay contacts 25 completes a circuit from terminal 15 to winding 12 to maintain the motor in operation after contacts 34 of start switch 32 are opened by releasing manual pressure on the start switch.

At the same time, closing of relay contacts 24 completes an alternate circuit for energization of relay coil 21 after contacts 33 have been opened by releasing manual pressure on start switch 32 which would otherwise deenergize relay coil 20. The alternate circuit for energization of relay coil 20 comprises relay contacts 24, normally closed stop switch 30, resistance element 17 and winding 12. The reason for securing resistance element 17 at a predetermined voltage point or tap on winding 12 now becomes apparent because the winding supplies a small fraction of the total current flowing therethrough to relay coil 20 to maintain it energized.

In the event of an overload condition being imposed on motor 11, an excessively heavy current will flow through winding 12 and the winding will begin to rise in temperature. Since resistance element 17 is in intimate heat transfer relation with winding 12, and, as has been previously described, is of the positive temperature coefficient type, the resistance of the resistance element will begin to rise.

By proper selection of component characteristics, resistance element 17 is designed to have a resistance at a predetermined motor protection or control temperature such that, for the predetermined voltage tap on the winding 12 or other voltage location to which it is connected, the current flowing through relay coil 20 will be limited to a predetermined amount, due to a predetermined resistance condition of the resistance element 17, where the relay will be deenergized and relay contacts 24 and 25 will be opened. Opening of relay contacts 25 takes motor 11 off the line by interrupting the supply of current to winding 12. At the same time, opening of relay contacts 24 positively deenergizes relay 21 by totally interrupting the supply of current to relay coil 20. Consequently, chattering of relay contacts 25 is prevented and subsequent cooling of winding 12 and resistance element 17 can not automatically start motor 11 without someone again manually depressing start switch 32. It will be understood that stop switch 30, as shown in the drawing, serves a similar function in that opening of switch 30 also deenergizes relay 21 opening relay contacts 24 and 25 and positively stops motor 11, and similarly, motor 11 can not be accidentally started thereafter without manually depressing start switch 32.

It will be understood that automatic restart of motor 11 can be provided if desired by making modifications in the above described embodiment of this invention which are readily within the skill of the art. It will also be appreciated that various additional warning or control functions can be incorporated in addition to or alternatively instead of means for taking motor 11 off the line. For example, over-temperature protection circuit 10 could comprise various warning lights or other signals, means to disengage a suitable clutch mechanism to unload motor 11, or means to otherwise lessen the load on motor 11, if desired.

Figure 2:
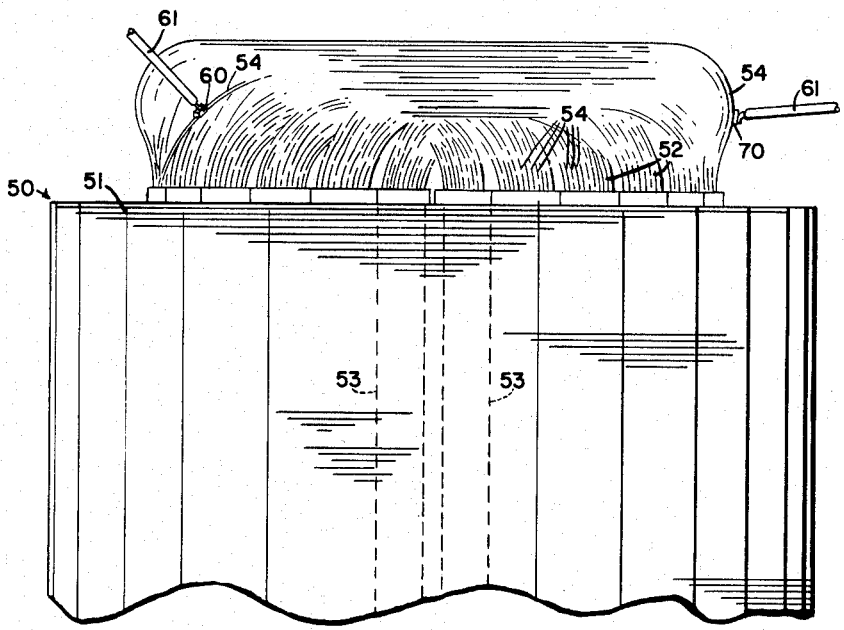
FIGURE 2 illustrates an end view of a dynamoelectric machine showing the temperature sensitive resistance elements incorporated therein.
Figure 3:
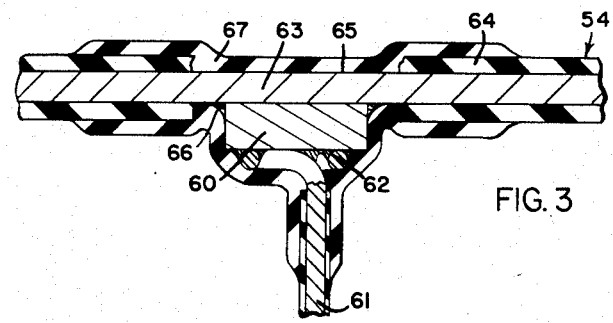
FIGURE 3 is an enlarged view, partially in cross-section, through a portion of a dynamoelectric machine winding having a temperature sensitive resistance element secured thereto.

FIGURES 2 and 3 illustrate in more detail a suitable location of a temperature sensitive resistance element in a dynamoelectric machine and the method of attaching it to a machine winding. Stator 51 of dynamoelectric machine 50 is provided with a plurality of coils 52 disposed in suitable slots 53 in the stator member. Each of coils 52 may comprise a number of individual conductor windings 54 depending on the type of dynamoelectric machine to which this invention is applied. In the embodiment illustrated in this figure, two temperature sensitive resistance elements 60 and 70 are shown secured to individual conductor windings of a three-phase random wound motor. As will be subsequently explained, it is preferred to use a pair of temperature sensitive resistance elements for more complete over-temperature protection of a three-phase motor winding.

FIGURE 3 shows an enlarged detail of one of the individual conductor windings 54 having a temperature sensitive resistance element 60 secured thereto. Conductor winding 54 comprises an inner conductor member 63 of a suitable conducting metal such as copper, and an outer insulating sheath 64 which may comprise enamel, varnish, cotton, or other suitable insulating materials such as vinyl resin. A portion of this insulating sheath is stripped away at 65 from conductor 63 to expose the bare conductor metal.

A suitable temperature sensitive resistance element 60 is electrically and physically secured to conductor winding 63 in intimate heat transfer relation therewith by directly soldering it to the exposed bare conductor at 66 in region 65 thereof. The particular composition of solder employed will be one which is suitable for bonding the resistance element to the conductor winding without impairing the electrical properties of either. This composition will depend upon the particular resistance element used, as is well understood in the art. For example, a solder comprising 95% tin and 5% silver is suitable for use with the described temperature sensitive element comprising a compound of barium, strontium and titanium. It is apparent that if the mechanical connection between resistance element 60 and conductor 63 permits any appreciable amount of solder to flow and solidify between these two elements, the solder employed must be a relatively good heat conductor in order to preserve the intimate heat transfer relation therebetween. In either event, resistance element 60 is considered herein to be in direct physical or mechanical contact with conductor 63 for purposes of description. It will also be observed that the area of contact between resistance element 60 and conductor 63 actually forms a terminal of the resistance element, placing it in direct electrical and physical contact with the conductor rather than through the intermediary of a conductor wire.

The mechanical contact of the resistance element and the conductor wire provides excellent heat transfer relation therebetween. The temperature sensitive resistance element is preferably secured for the purpose of this invention to a winding of the dynamoelectric machine at a predetermined voltage point or tap between the voltage points represented by the ends of the winding. While the temperature sensitive resistance element can, in practice, be connected to the windings at one of its ends, it is preferred to connect it at a predetermined intermediate voltage point in order to better match the temperature-resistance values of presently commercially available positive temperature coefficient thermistors to commercially available relay coil impedances and operating voltages.

For example, a temperature sensitive resistance element having a resistance at 75° C. of 50 ohms and a resistance at 180° C. of 100,000 ohms has been found suitable for use when connected to approximately a 30 volt tap in series with readily available 24 volt relay coils, having approximately 200 ohms impedance at 60 cycles, to suitably provide a maximum motor temperature of 105° C. Under these conditions, the value of the current limiting resistor in series with the relay coil may suitably be about 2,000 ohms when connected to a 220 volt line. It will be understood that it is within the skill of the art to determine actual voltage and resistance values for a given temperature sensitive resistance element of known characteristics, relay impedance, and a given desired motor temperature limit at which the relay circuit is to be actuated or controlled.

In practice, the selected voltage tap, which is determined to be suitable for the particular components being used, may be located by any desired means at an exposed location on the dynamoelectric machine. After locating the desired voltage point, the insulation is removed from the conductor wire and the bare metal of the conductor is exposed. The relatively small temperature sensitive resistance element is then physically secured to the conductor wire in intimate heat transfer relation therewith by being soldered or otherwise secured in direct electrical and physical contact with the conductor wire. Thereafter, the conductor wire and resistance element may be reinsulated by coating it with a suitable resin, such as an epoxy or vinyl resin. The method of motor protection herein described advantageously lends itself to use either by factory installation of the resistance element or by installation of the resistance element subsequent to manufacture of the motor, such as in preexisting equipment.

It is desirable that resistance element 60 have a relatively low thermal capacity with respect to that of wire 63 so that its temperature closely follows the temperature of conductor winding 63. This may be suitably achieved by making resistance element 60 of relatively small physical proportions so that it has a cross-sectional area of substantially the same magnitude as that of the conductor winding in a transverse plane through the two elements.

A suitable conductor wire is secured to a face of resistance element 60 opposite that contacting conductor 63 by soldering at 62 and the joint between conductor 61 and resistance element 60 forms a second terminal of the resistance element. After securing resistance element 60 to conductor 63 in the manner described, conductor 63 may be reinsulated by applying a suitable insulating varnish or resin 67 over the assembly and curing the insulation in order to provide electrical insulation and mechanical protection for the assembly.

Figure 4:
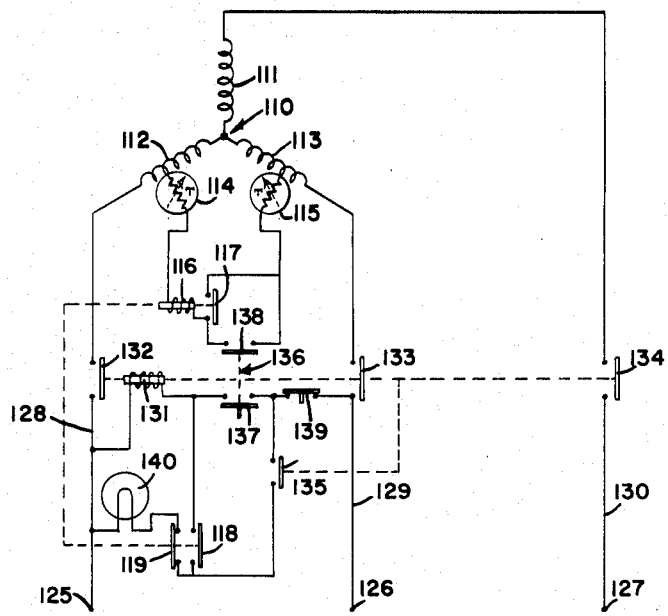
FIGURE 4 is a schematic diagram of a three-phase dynamoelectric machine having a protection circuit in accordance with this invention.

Referring to FIGURE 4, there is shown a schematic electrical diagram of a suitable motor protection system applied to a three-phase star connected dynamoelectric machine 110, which will be referred to for purposes of description as being a three-phase motor, but which may illustrate an application of this invention to multiple phase dynamoelectric machinery in general. Motor 110 is provided with phase windings 111, 112, 113 connected in star relation. Suitable over-temperature protection may be provided for a machine of this type by employing one or more single phase circuits shown in the preceding embodiment in one or more phase windings of a multiple phase machine, if desired.

However, it is preferred to utilize the circuit shown in this figure wherein a temperature sensitive resistance element 114 is electrically directly secured to phase winding 112 in intimate heat transfer relation therewith, as previously described, at a predetermined electrical voltage point thereon intermediate the voltage points represented by the ends of phase winding 112. A second temperature resistance element 115 is electrically directly connected to phase winding 113 at a predetermined intermediate voltage point thereon and in intimate heat transfer relation therewith, also as previously described.

A control relay 116 having normally open relay contacts 117 and 118 and normally closed relay contacts 119 thereon is connected in series with relay contacts 117 between the remaining terminals of resistance elements 114 and 115 as shown in the drawing. Depending on the electrical characteristics of the resistance elements and of control relay 116, it may be desirable to include a series resistor (not shown) also in series with the relay coil as a current limiting means to protect the relay from an overvoltage or over-current condition depending upon the voltage between the taps to which the resistance elements are connected.

A momentary contact type start switch 136, having a pair of normally open contacts 137 and 138, is provided as a starting means for motor 110. Start switch contacts 138 are connected in parallel with control relay contacts 117, as shown in the drawing. Current is provided for operation of motor 110 from line terminals 125, 126, 127 through conductors 128, 129, 130 respectively.

A starting relay is connected across line terminals 125 and 126 in series with start switch contacts 137 and a normally closed momentary disconnect stop switch 139. Starting relay 131 has four pairs of normally open contacts 132, 133, 134, 135. Contacts 132, 133, 134 are connected between phase windings 112, 111, 113 and their respective line current conductors 128, 129, 130 in order to interrupt the supply of current to the motor thereby normally taking the motor off the line when the starting relay is in a deenergized condition. Control relay contacts 118 and starting relay contacts 135 are connected in series with each other and in parallel with start switch contacts 137. An indicator light 140 may be connected in series with normally closed control relay contacts 119 between the junction of contacts 135 and 118 and a line current terminal 125.

In operation, start switch 136 is depressed momentarily closing contacts 137 and 138. Closing of contacts 137 energizes start relay 131 and closes contacts 132, 133, 134, 135 thereby connecting the phase windings of motor 110 to the line. Since phase windings 112 and 113 are connected to the line, a voltage appears between the points at which resistance elements 114 and 115 are connected and current flows through control relay 116 via momentarily closed contacts 138, thereby energizing the control relay. Energization of control relay 116 closes contacts 117, 118 and opens contacts 119. Pressure may now be released on start switch 136 opening contacts 137 and 138, and the motor will continue operating normally assuming that no locked rotor or excessive motor load condition is present.

If, however, a locked rotor or excessive overload condition occurs, temperature sensitive resistance elements 114 and 115 will sense the rising temperature of phase windings 112 and 113 to which they are connected. The resistance of resistance elements 114 to 115 will therefore rise to a predetermined condition where the corresponding current flowing through control relay 116 or the related voltage across the relay terminals is insufficient to maintain the control relay energized. At this time contacts 117 and 118 will open and contacts 119 will close. Opening of contacts 118 interrupts the current flow through start relay 131 since start contacts 137 will open after manual pressure is released on the start switch and the alternate path through contacts 135 and 118 has been opened. Consequently, start relay 131 is deenergized and contacts 132, 133, 134 open and take the motor off the line. The presence of normally open control relay contacts 117 insures that once control relay 116 has been momentarily deenergized it will remain at a deenergized state until the motor is manually started again because start switch 136 must be depressed in order to provide a current path through the control relay and the start relay can not remain energized without the control relay closing contacts 118.

Stop switch 139 is provided to deenergize starting relay 131, if desired, by momentarily interrupting the current flow through the starting relay, which in turn deenergizes control relay 116 opening control relay contacts 117 and then prevent restarting of the motor after closing of stop switch 139 until start switch 136 is again depressed.

Assuming that the motor has not been given sufficient time to cool down, if the operator attempts to start the motor again by depressing start switch 136, current will be supplied to motor 110 but control relay 116 will remain deenergized due to the high resistance condition of resistance elements 114 and 115. Under these circumstances, contacts 119 will remain closed and signal light 140 will be connected across the line through start relay contacts 135 which remain closed as long as the start button is depressed. Consequently, the operator will observe that signal light 140 remains on while attempting to start motor 110 and will be warned of an over-temperature condition existing. It will be observed that, during a normal start when motor 110 is cold, signal 140 may instantaneously flicker but can not remain on for more than the instant which it takes for control relay 116 to become energized.

It is preferred to employ temperature sensitive resistance elements in at least two phase windings of a three-phase motor because in that arrangement loss of voltage to any one phase results in actuation of the motor protection system as well as an over-temperature condition in either of the phase windings having the resistance elements secured thereto. Loss of voltage in the unprotected phase winding will cause actuation of the motor protection circuit due to excessive heating of the remaining phase windings under "single phase" conditions.

It will be seen, therefore, that the temperature sensitive resistance elements actuate an over-temperature protection circuit, which in turn may perform any desired function, such as taking the motor off the line, or providing a signal to indicate malfunctioning or otherwise perform a desired over-temperature function, such as unloading the motor, depending upon the circuitry associated with the over-temperature protection function. Many modifications of the circuit shown will readily occur to those skilled in the art.

Figure 5:
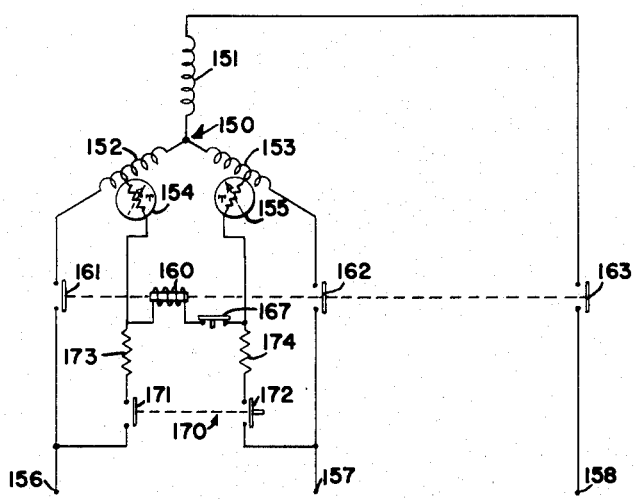
FIGURE 5 shows a simplified embodiment of a three-phase dynamoelectric machine having a motor protection circuit which combines the function of a starting relay with a motor protection relay.

One of these modifications is illustrated in FIGURE 5 wherein a dynamoelectric machine 150 which may comprise a three-phase motor is illustrated as having phase windings 151, 152, 153 arranged in a star connection. Temperature sensitive resistance elements 154 and 155 are directly connected at predetermined voltage points intermediate the ends of phase windings 152 and 153 respectively. In this embodiment, a single control relay 160 provides both the functions of the start relay and control relay shown in the previous embodiment.

Control relay 160 is connected in series with resistance elements 154 and 155 through a stop switch 167. Control relay 160 has contacts 161, 162, 163 associated therewith which are in series with the conductors which supply current from line terminals 156, 157, 158 to the phase windings of the motor. A start switch 170 of the momentary contact type is provided with contacts 171 and 172 for energizing control relay 160 directly from line terminals 156 and 157. Resistors 173 and 174 are placed in series with contacts 171 and 172 respectively in order to limit the current or voltage supplied to energize control relay 160 upon depressing start switch 170 to close contacts 171 and 172.

If motor 150 is cold, it may be started by depressing start switch 170 which energizes control relay 160 and closes contacts 161, 162, 163 supplying current for operation of the motor to the phase windings. After start switch 170 is released, contacts 171 and 172 open, but current continues to flow through the control relay in series with resistance elements 154, 155 to maintain the control relay energized due to the potential difference between the points at which resistance elements 154 and 155 are connected to phase windings 152, 153.

On the occurrence of an over-temperature condition resulting in the rise in temperature of either or both of temperature sensitive resistance elements 154, 155, their resistance increases to a predetermined condition and limits the corresponding current flowing through control relay 160 to a point where it becomes deenergized at a predetermined maximum desired winding temperature. Consequently, contacts 161, 162, 163 are opened, taking the motor off the line and preventing the restarting of the motor upon cooling until start switch 170 is again depressed. Stop switch 167 of the momentary disconnect type is provided to positively deenergize control relay 160 if it is desired to stop motor 150, and it will be observed that the motor remains off the line until start switch 170 is again depressed.

While preferred embodiments of this invention have been described and illustrated, it will be appreciated that numerous modifications in circuits and over-temperature control functions actuated by the temperature sensitive resistance elements may be provided if desired. The temperature sensitive resistance elements referred to in the preferred embodiments of this invention are positive temperature coefficient types which provide fail-safe over-temperature protection with a minimum of circuit complexity and with simple, easily obtainable relays. It will be understood, however, that by appropriate circuit modifications, other forms of temperature sensitive resistance elements may be used, provided that they are directly connected to the dynamoelectric machine winding in order to provide intimate heat transfer relation therebetween.

By the practice of this invention, a given motor design may be safely operated much closer to maximum permissible insulation temperatures because of the speed at which the described inherent motor protection systems respond to a rise in winding temperature. Further, overshooting of the winding temperature, particularly during periods of locked rotor condition from a cold motor start, with motors having high temperature rise rates, is rendered negligible. Consequently, this invention provides means and a method for protecting a motor against locked rotor as well as a running overload which prior art devices have failed to achieve satisfactorily. It will also be understood that this invention may be practiced on delta-connected motors and generators and upon any dynamoelectric machinery for which it is desired to provide over-temperature sensing or protection and that the described relays may be of the solid state or vacuum tube types if desired to provide either stepwise or variable control functions, as required.

Accordingly, it will be understood that this invention may be otherwise embodied as defined within the scope of the following claims.

I claim:

1. An over-temperature protection system for a dynamoelectric machine comprising the combination of: a conductor winding having a current carrying electrical conductor in said dynamoelectric machine; a temperature sensitive resistance element secured in direct electrical and physical contact with the electrical conductor of said conductor winding so that said temperature sensitive resistance element is in intimate heat transfer relation with said winding; and an over-temperature protection circuit for said dynamoelectric machine associated therewith, said temperature sensitive resistance element being connected to said over-temperature protection circuit to control the operation thereof.

2. An over-temperature protection system for a dynamoelectric machine comprising a conductor winding having a current carrying electrical conductor; a temperature sensitive resistance element secured in direct physical and electrical contact with the electrical conductor of said winding at an intermediate voltage point between the ends of said winding; and an over-temperature protection circuit for said dynamoelectric machine associated therewith, said temperature sensitive resistance element being connected to said over-temperature protection circuit to control the operation thereof.

3. A fail-safe combined over-temperature protection and motor starting system comprising: a positive temperature coefficient temperature sensitive resistance element connected in direct electrical and physical contact with the electrical conductor of a winding of said motor in heat transfer relation therewith, a relay coil electrically connected in series with said resistance element, a set of normally open contacts associated with said relay in series with the supply of line current to said motor, and start switch means to energize said relay coil to close said set of contacts and start said motor, said resistance element serving to pass sufficient current during normal operation of said motor to maintain said relay coil energized and to limit the current passed through said relay coil under conditions of over-temperature of said motor winding to an extent sufficient to deenergize said relay coil and open said set of contacts associated therewith so as to take said motor off the line.

4. An over-temperature protection system for a dynamoelectric machine comprising a current carrying conductor winding having a current carrying electrical conductor, a temperature sensitive resistance element electrical connected to said dynamoelectric machine winding at an intermediate voltage point thereon, said resistance element being secured in direct physical and electrical contact with the electrical conductor of said dynamoelectric machine winding, and an over-temperature protection circuit for said dynamoelectric machine, said temperature sensitive resistance element being connected to said over-temperature protection circuit to control the operation thereof in response to the resistance condition of said temperature sensitive resistance element.

5. An over-temperature protection system for a dynamoelectric machine comprising a current carrying conductor winding having an electrical conductor and having an over-temperature protection circuit associated therewith which comprises: a temperature sensitive resistance element having a portion thereof comprising an electrical terminal electrically and physically connected directly to the electrical conductor of said conductor winding at an intermediate voltage point therealong, said resistance element having another electrical terminal electrically connected to a switch means, and said switch means being connected to terminate the flow of current through said winding upon the existence of a predetermined resistance condition of said temperature sensitive resistance element.

6. A motor protection system comprising a temperature sensitive resistance element secured in direct physical and electrical contact with the electrical conductor of a phase winding of said motor, control relay means electrically connected with said resistance element to be controlled in response to a predetermined current passed from said motor winding through said resistance element, conductor means for supplying electric current to said phase winding for operation of said motor, said relay means being electrically associated with said conductor means so that the supply of current to said motor is interrupted upon sensing of an undesirably high winding temperature by said temperature sensitive resistance element.

7. A motor protection system for a multiple phase motor comprising a first temperature sensitive resistance element connected in direct electrical and physical contact with the electrical conductor of a first phase winding of said motor, a second temperature sensitive resistance element connected in direct electrical and physical contact with the electrical conductor of a second phase winding of said motor, said first and second temperature sensitive resistance elements being of the positive temperature coefficient type, a relay coil electrically connected in series between said resistance elements so as to be energized by current flowing through said resistance elements, and contact means associated with said relay coil for interrupting the supply of electric current to said motor upon deenergization of said relay coil by a reduction of current flowing therethrough upon an undesired rise in temperature of one of said motor windings.

8. A motor protection system for a three-phase motor comprising, a first temperature sensitive resistance element directly connected in electrical and physical contact with the electrical conductor of a first phase winding of said motor at an intermediate voltage point thereon, a second temperature sensitive resistance element directly connected in electrical and physical contact with the electrical conductor of a second phase winding of said motor at an intermediate voltage point thereon, switch means having an electrical actuator, said first and said second resistance elements being connected in a circuit with said electrical actuator, said switch means being connected with said motor to interrupt the supply of current to said motor upon actuation of said switch by the occurrence of a predetermined resistance condition of either of said resistors due to sensing of an undesired temperature condition of said motor winding.

References Cited by the Examiner
UNITED STATES PATENTS

| | | | |
|---|---|---|---|
| 3,036,242 | 5/62 | MacGregor | 317—41 |
| 3,065,381 | 11/62 | Kyle | 318—473 |
| 3,079,524 | 2/63 | Gibson et al. | 317—13 |
| 3,116,437 | 12/63 | Harvey | 317—15 |
| 3,131,331 | 4/64 | Ray | 317—123 |
| 3,142,773 | 7/64 | Snoberger | 310—68 |

FOREIGN PATENTS 440,392    4/25    Germany.

SAMUEL BERNSTEIN, *Primary Examiner*.